United States Patent
Wyland

(10) Patent No.: US 6,810,455 B2
(45) Date of Patent: Oct. 26, 2004

(54) BUS ARBITRATION SYSTEM AND METHOD FOR CARRYING OUT A CENTRALIZED ARBITRATION WITH INDEPENDENT BUS REQUEST AND GRANT LINES

(75) Inventor: David C. Wyland, Morgan Hill, CA (US)

(73) Assignee: Cradle Technologies, Inc., Sunnyvale, CA (US)

( * ) Notice: Subject to any disclaimer, the term of this patent is extended or adjusted under 35 U.S.C. 154(b) by 509 days.

(21) Appl. No.: 09/968,097

(22) Filed: Sep. 28, 2001

(65) Prior Publication Data

US 2003/0065849 A1 Apr. 3, 2003

(51) Int. Cl.[7] .................. G06F 13/362; G06F 13/14; G06F 13/38
(52) U.S. Cl. .................. 710/113; 710/33; 710/241
(58) Field of Search .................. 710/113–118, 240, 710/241, 33–35

(56) References Cited

U.S. PATENT DOCUMENTS

| | | | |
|---|---|---|---|
| 5,111,424 A | | 5/1992 | Donaldson et al. ......... 395/725 |
| 5,276,887 A | * | 1/1994 | Haynie ....................... 710/114 |
| 5,426,740 A | | 6/1995 | Bennett ...................... 395/325 |
| 5,440,698 A | * | 8/1995 | Sindhu et al. ............... 709/225 |
| 5,473,762 A | * | 12/1995 | Krein et al. ................. 710/107 |
| 5,528,764 A | | 6/1996 | Heil ............................ 395/293 |
| 5,611,058 A | | 3/1997 | Moore et al. ............... 395/309 |
| 5,774,455 A | * | 6/1998 | Kawase et al. ............. 370/232 |
| 5,898,694 A | | 4/1999 | Ilyadis et al. ............... 370/462 |
| 6,425,032 B1 | * | 7/2002 | Prasanna .................... 710/117 |

* cited by examiner

Primary Examiner—Sumati Lefkowitz
Assistant Examiner—Trisha Vu
(74) Attorney, Agent, or Firm—Schneck & Schneck; Thomas Schneck

(57) ABSTRACT

Disclosed is a bus arbitration system and method which assume that each operation using the bus requires from one to five bus clock cycles. Each potential bus master has a dedicated bus request line and a dedicated bus grant line, both of which are connected to a centralized bus arbiter in the bus arbitration system of the present invention. When a potential bus master wants to use the bus for, for instance, three bus clock cycles, the bus master activates its dedicated bus request line for the same number of bus clock cycles as it would need of bus use (i.e. three bus clock cycles). This three clock wide bus request pulse is recorded in a bus request recording circuit in the centralized bus arbiter. Access to the bus can be granted by the centralized bus arbiter to a winning bus master under any bus arbitration policies. If a potential bus master is chosen to be the winning bus master, the centralized bus arbiter activates the winning bus master's dedicated bus grant line for the same number of bus clock cycles as requested by the bus master, i.e. for three bus clock cycles. So, the bus master will have sufficient use of the bus for its desired operation. After that, the arbiter chooses the next winning bus master and activates its dedicated grant line in the same manner described above, and so on.

14 Claims, 3 Drawing Sheets

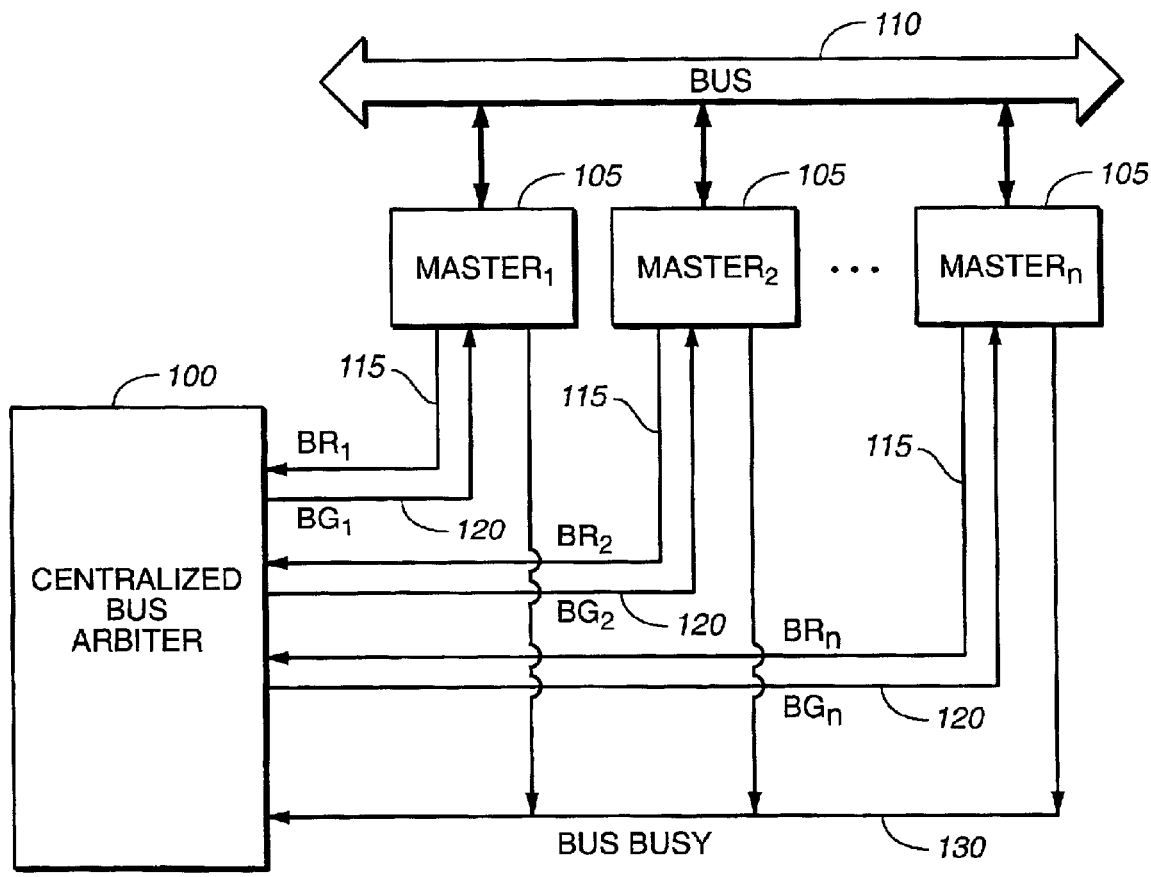
FIG._1 (PRIOR ART)
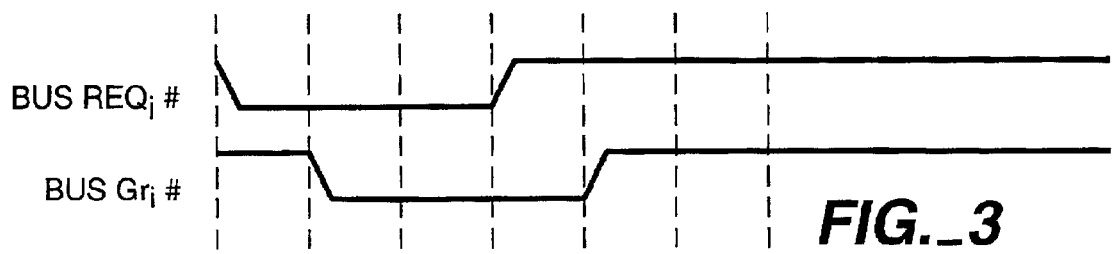
FIG._3

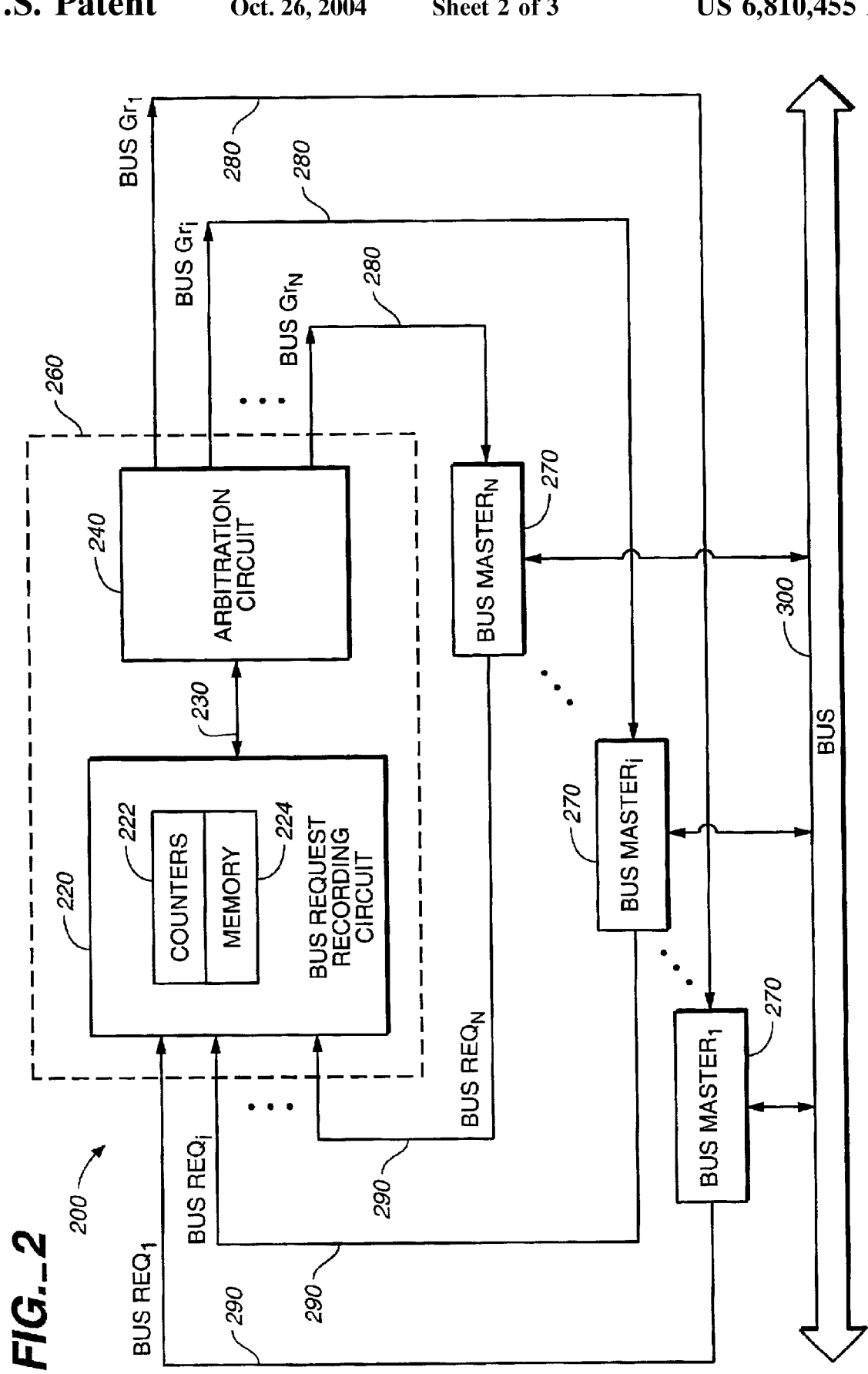
FIG._2

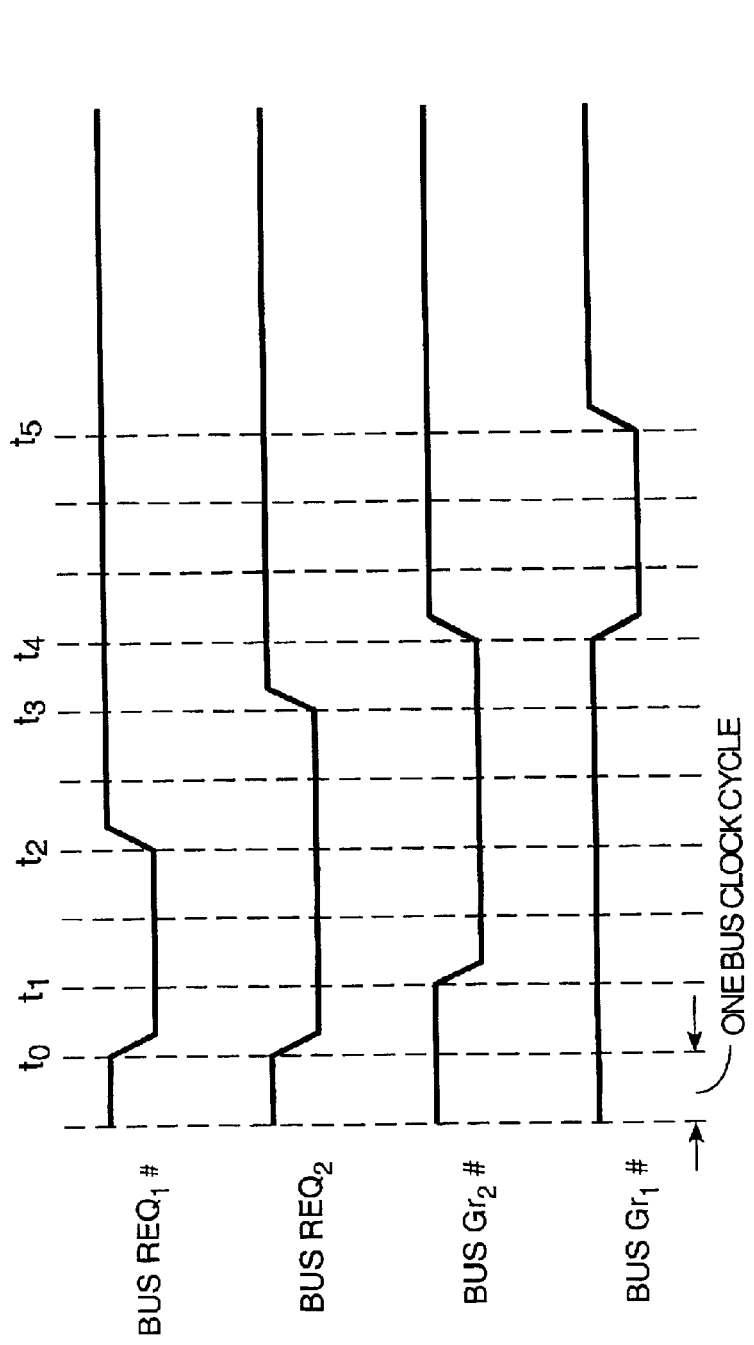
FIG._4
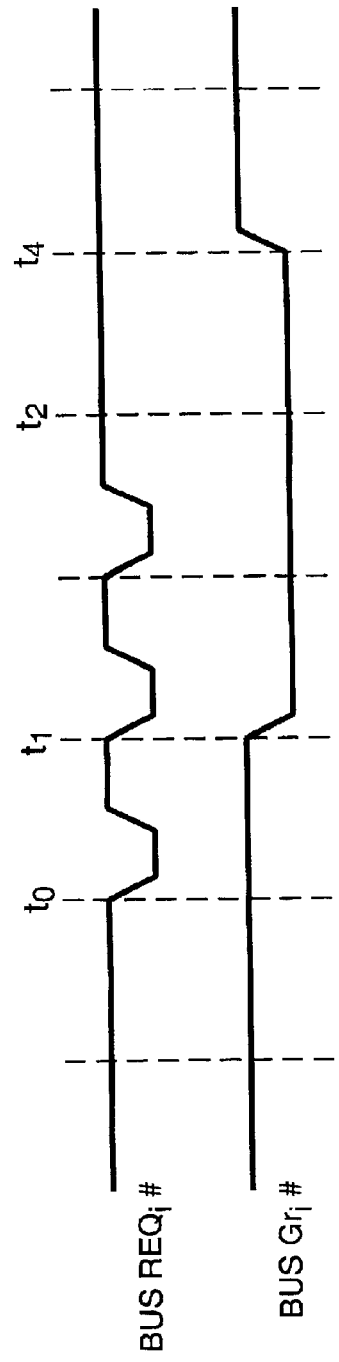
FIG._5

BUS ARBITRATION SYSTEM AND METHOD FOR CARRYING OUT A CENTRALIZED ARBITRATION WITH INDEPENDENT BUS REQUEST AND GRANT LINES

TECHNICAL FIELD

The present invention relates to bus arbitration systems, and more particularly to a bus arbitration system using dedicated bus request and bus grant lines for bus masters.

BACKGROUND ART

In digital computer systems having a plurality of modules, such as processor modules, controller modules, communications interface or relay modules, etc., a medium is employed whereby these modules can transfer data among each other. Typically, the medium employed is a physical data channel known as a bus. The bus is connected to a communications port on each module. Each module is a potential bus master that needs the bus to communicate with other modules. It is possible that more than one potential bus master may request to use the bus simultaneously; therefore, there must be a bus arbiter to choose a winning bus master for bus grant. When the winning bus master finishes using the bus, the bus arbiter chooses the next winner, and so on. There are several well known bus allocation (arbitration) policies: fixed priority, rotating priority, round robin, least recently used policy, and first come first served scheme.

One of the most well known bus arbitration systems is the typical centralized bus arbiter with independent (dedicated) bus request and bus grant lines as shown in FIG. 1. Each potential bus master 105 has an independent bus request line 115 connected to a centralized bus arbiter 100 and an independent bus grant line 120 coming from centralized bus arbiter 100. A bus busy line 130 is shared by all potential bus masters 105. All bus masters 105 have interfaces with a bus 110. The protocol of allocating bus 110 is as follows: Master$_i$ 105 (i=1,2, . . . , or n) requests access to bus 110 by activating its dedicated bus request line BR$_i$ 115. If bus busy line 130 is active indicating bus 110 is busy, i.e., being used by a bus master 105, Master$_i$ keeps activating its dedicated bus request line BR$_i$ until it is granted access to bus 110. This can be done by pulling low bus request line BR$_i$ if bus request signal on bus request line BR$_i$ is active low.

If bus busy line 130 is passive, i.e., no master is using bus 110, centralized bus arbiter 100 immediately allocates bus 110 to Master$_i$ by activating Master$_i$'s dedicated grant line BG$_i$ 120. Master$_i$ then deactivates its request line BR$_i$ and activates bus busy line 130. When Master$_i$ finishes using bus 110, Master$_i$ deactivates bus busy line 130 so that centralized bus arbiter 100 knows that it can select another winning bus master 105 for bus grant.

When bus busy line 130 is active, centralized bus arbiter 100 does not accept any bus requests. When several request lines are active when bus busy line 130 becomes passive, centralized bus arbiter 100 can use any of the bus allocation policies mentioned above to choose a winner among the requesting bus masters 105.

Although the centralized bus arbiter with independent bus request and bus grant lines in FIG. 1 has faster arbitration time compared with daisy-chained arbiters, it requires a large number of bus arbitration lines (bus request lines, bus grant lines, bus busy lines). Therefore, it is an object of the present invention to propose a bus arbitration system and method that require fewer bus arbitration lines to implement the centralized bus arbiter with independent bus request and bus grant lines.

SUMMARY OF THE INVENTION

The bus arbitration system and method of the present invention achieve the stated object by assuming that each operation using the bus takes from one to five bus clock cycles. Each potential bus master has its dedicated bus request line and a dedicated bus grant line, both of which are connected to a centralized bus arbiter in the bus arbitration system of the present invention. When a potential bus master wants to use the bus for, for instance, three bus clock cycles, the potential bus master activates its dedicated bus request line for the same number of bus clock cycles as it would need of bus use (i.e. three bus clock cycles). This three clock wide bus request pulse is recorded in a bus request recording circuit in the centralized bus arbiter. Access to the bus can be granted by the centralized bus arbiter to a winning bus master under any bus arbitration policy. If a potential bus master is chosen to be the winning bus master, the centralized bus arbiter activates the winning bus master's dedicated bus grant line for the same number of bus clock cycles as requested by the bus master, i.e. for three bus clock cycles. So, the bus master will have sufficient use of the bus for its desired operation. After that, the arbiter chooses the next winning bus master and activates its dedicated grant line in the same manner as described above, and so on. No bus busy line is needed in the bus arbitration system of the present invention.

BRIEF DESCRIPTION OF THE DRAWINGS

FIG. 1 is the block diagram of a typical bus arbitration system as known in the prior art having a centralized bus arbiter with independent bus request and bus grant lines for each potential bus master.

FIG. 2 is the block diagram of a bus arbitration system of the present invention.

FIG. 3 is a timing diagram of bus request and bus grant pulses in the bus arbitration system of FIG. 2 according to a first preferred embodiment of the present invention.

FIG. 4 is another timing diagram of bus request and bus grant pulses in the bus arbitration system of FIG. 2 according to the first preferred embodiment of the present invention.

FIG. 5 is a timing diagram of bus request and bus grant pulses in the bus arbitration system of FIG. 2 according to a second preferred embodiment of the present invention.

BEST MODE FOR CARRYING OUT THE INVENTION

With reference to FIG. 2, the bus arbitration system 200 of the present invention comprises a centralized bus arbiter 260 which has a bus request recording circuit 220 and an arbitration circuit 240. Bus request recording circuit 220 and arbitration circuit 240 are coupled together via a connection 230.

Arbitration circuit 240 of centralized bus arbiter 260 has a plurality of bus grant lines 280 connecting to a plurality of potential bus masters 270. Each bus grant line 280 is dedicated to a potential bus master 270. Arbitration circuit 240 uses bus grant lines 280 to send bus grant signals one at a time to bus masters 270.

Bus request recording circuit 220 of centralized bus arbiter 260 has a plurality of bus request lines 290 coming from potential bus masters 270. Each bus request line 290 is dedicated to a potential bus master 270. Centralized bus arbiter 260 uses bus request lines 290 to receive bus request signals from potential bus masters 270.

Each bus master 270 connects to a shared bus 300. Bus 300 is used for communication and data transfer between bus masters 270.

Bus arbitration system 200 works as follows. Bus masters 270, if need be, send their bus requests to bus request recording circuit 220 via bus request lines 290. In a first preferred embodiment of the present invention, each bus request is a pulse whose width is equal to the number of bus clock cycles needed by the bus master 270 which made the bus request. For example, if a bus master 270 needs to use bus 300 for three bus clock cycles, it sends a pulse which is three bus clock cycles wide to bus request recording circuit 220 via its own bus request line 290. In other words, BUS MASTER$_i$ 270 (i=1 to n) activates its bus request line BusReq$_i$ 290 for three bus clock cycles. If the bus request signals are active low, for instance, BUS MASTER$_i$ 270 can pull its own bus request line BusReq$_i$ 290 low for three bus clock cycles as shown in FIG. 3. In FIG. 3, character # indicates that bus request signal BusReq$_i$# is active low.

In the first preferred embodiment of the present invention, the function of bus arbitration system 200 is based on the assumption that each bus operation takes from one to five bus clock cycles. However, any other number other than five can be used in the assumption above.

Bus request recording circuit 220 receives all the incoming bus requests from requesting bus masters 270 and records these bus requests along with their desired bus use in terms of the number of bus clock cycles requested. In the first preferred embodiment, bus request recording circuit 220 has counters 222 and memory 224 to record the numbers of requested bus clock cycles of the incoming bus requests from the bus masters 270. If BUS MASTER$_i$ 270 activates bus request line BusReq$_i$ 290, a counter 222 assigned to bus request line BusReq$_i$ 290 counts until BUS MASTER$_i$ 270 deactivates bus request line BusReq$_i$ 290. The count value representing the number of bus clock cycles requested is stored in some memory 224 in bus request recording circuit 220 for later use by arbitration circuit 240 in selecting a winning bus master 270 and granting bus access to that winning bus master 270.

Accessing the information stored in bus request recording circuit 220 via connection 230, arbitration circuit 240 selects a winning bus master 270 among bus masters 270 that have unfulfilled bus requests and grant it bus access. The selection can be under any arbitration policies: fixed priority, rotating priority, round robin, least recently used policy, first come first served scheme, etc.

Arbitration circuit 240 makes the bus grant by sending a bus grant signal to the winning bus masters 270 via the bus grant line 280 of that winning bus master 270. In the first preferred embodiment, the bus grant signal to the winning bus masters 270 is a pulse having the same width as the bus request signal previously made by that winning bus master 270. In the example above, the bus grant signal should be a pulse three bus clock cycles wide. In other words, if BUS MASTER$_i$ is the winning bus master, arbitration circuit 240 activates the bus grant line BusGr$_i$ of BUS MASTER$_i$ for three bus clock cycles. If the bus grant signals are active low, for instance, arbitration circuit 240 can pull low the bus grant line BusGr$_i$ of the winning BUS MASTER$_i$ for three bus clock cycles as shown in FIG. 3. In FIG. 3, character # indicates that bus grant signal BusGr$_i$# is active low.

At the end of the three bus clock cycles of bus use granted to the current winning bus master, using the information stored in bus request recording circuit 220, arbitration circuit 240 selects the next winning bus master 270 among bus masters 270 that have unfulfilled bus requests and grant it bus access in the same manner described above.

With reference to FIG. 3, a bus request signal BusReq$_i$# is the signal transmitted on bus request line BusReq$_i$. The character # indicates that bus request signal BusReq$_i$# is active low. Similarly, bus grant signal BusGr$_i$# is the signal transmitted on bus grant line BusGr$_i$ and is active low. In FIG. 3, BusReq$_i$# is low for three bus clock cycles (i.e. a pulse three bus clock cycles wide). This means that the BUS MASTER$_i$ 270 which sends this bus request signal BusReq$_i$# is requesting three bus clock cycles of bus use. Assuming that BUS MASTER$_i$ 270 is chosen by arbitration circuit 240 (FIG. 2) for bus access, arbitration circuit 240 activates bus grant line BusGr$_i$ of BUS MASTER$_i$ 270 by pulling bus grant line BusGr$_i$ low for the same number of bus clock cycles as previously requested by BUS MASTER$_i$ 270, i.e. three bus clock cycles.

With reference again to FIG. 3, there is a delay of one bus clock cycle between the time BUS MASTER$_i$ starts sending bus request signal BusReq$_i$# to bus request recording circuit 220 and the time arbitration circuit 240 starts sending bus grant signal BusGr$_i$# to BUS MASTER$_i$. This is the case when there is only one bus master (BUS MASTER$_i$) requesting access to bus 300. Arbitration circuit 240 recognizes this bus request signal right away via connection 230 and responds by activating bus grant line BusGr$_i$ 280 of BUS MASTER$_i$ 270 by pulling bus grant line BusGr$_i$ low. When BUS MASTER$_i$ deactivates (pulling up) its bus grant line BusGr$_i$, arbitration circuit 240 recognizes this deactivation right away via connection 230 and responds by deactivating bus grant line BusGr$_i$ 280 of BUS MASTER$_i$ 270 by pulling bus grant line BusGr$_i$ high. If more than one bus master 270 requests access to bus 300, some bus master 270 must wait for a while for its turn to use bus 300. Bus grant signals BusGr$_i$# (i=1−n) can be used as chip select signal or transfer enable signal for BUS MASTER$_i$ 270 (i=1−n).

With reference to FIG. 4, at time t0 (at reset), BUS MASTER$_1$270 wants to use bus 300 for three bus clock cycles and sends a bus request to bus request recording circuit 220 by pulling down its bus request line BusReq$_1$ for three bus clock cycles. As the result, the bus request signal BusReq$_1$# on bus request line BusReq$_1$ goes low at t0, stays low for three bus clock cycles, and goes high at t2.

Supposing at t0, BUS MASTER$_2$ 270 wants to use bus 300 for five bus clock cycles and sends a bus request to bus request recording circuit 220 by pulling down its bus request line BusReq$_2$ for five bus clock cycles. As the result, the bus request signal BusReq$_2$# on bus request line BusReq$_2$ goes low at t0, stays low for five bus clock cycles, and goes high at t3.

Centralized bus arbiter 260 (FIG. 2) recognizes these bus request signals BusReq$_1$# and BusReq$_2$# right away and arbitration is carried out. Assuming that BUS MASTER$_2$ has higher priority. At t1 (i.e. a delay of one bus clock cycle) centralized bus arbiter 260 sends a bus grant signal BusGr$_2$# on bus grant line BusGr$_2$ of BUS MASTER$_2$. The bus grant signal BusGr$_2$# is a pulse which is five bus clock cycles wide from t1 to t4.

In the mean time, the bus request signal BusReq$_1$# on bus request line BusReq$_1$ is recorded by bus request recording circuit 220 and later at the end of the five bus clock cycles of bus use granted to BUS MASTER$_2$, i.e., at time t4, centralized bus arbiter 260 sends a bus grant signal BusGr$_1$# on the bus grant line BusGr$_1$ of BUS MASTER$_1$. The bus grant signal BusGr$_1$# is a pulse which is three bus clock cycles wide from t4 to t5.

With the bus arbitration system 200 of the present invention in FIG. 2, there is no need for a bus busy line. Moreover, there is no need for a quota system because each bus operation never exceeds five bus clock cycles of bus use. Therefore, no bus cycles is wasted on switching between processes which happens in prior art bus arbitration systems when a process exceeds its bus time quota.

With reference to FIG. 5, instead of being a pulse as in the first preferred embodiment, each bus request may be a series of pulses according to a second preferred embodiment. The number of pulses in the series specifies the number of bus clock cycles of bus use requested by the requesting bus master 270. Each pulse in the series corresponds to one bus clock cycle. As shown in FIG. 5, assuming BUS MASTER$_i$ wants three bus clock cycles of bus use and sends a bus request to centralized bus arbiter 260 (FIG. 2) by sending a series of three consecutive pulses from time t0 to t2. Centralized bus arbiter 260 records this number of pulses and responds by sending a bus grant signal BusGri# on the bus grant line BusGr$_i$ of BUS MASTER$_i$. The bus grant signal BusGr$_i$# is a pulse which is three bus clock cycles wide from t1 to t4. Bus request recording circuit 220 should have counters 222 for counting the pulses of the incoming bus requests and some memory 224 for recording these counter values for later use by arbitration circuit 240 in selecting a winning bus master 270 and granting bus access to that winning bus master 270.

What is claimed is:

1. A bus arbitration system comprising:
   a bus;
   a plurality of bus masters, each said bus master being connected to said bus; and
   a centralized bus arbiter having:
   a plurality of bus request lines for receiving bus requests from said bus masters, each bus request by a requesting bus master specifying a number of bus clock cycles of bus use requested by said requesting bus master; and
   a plurality of bus grant lines for sending bus grants to said bus masters, each of said bus grant lines being dedicated to each of said bus masters,
   wherein a bus request by a requesting bus master is a pulse whose width is equal to the number of bus clock cycles of bus use requested by said requesting bus master.

2. The bus arbitration system of claim 1 wherein each bus grant by said centralized bus arbiter to a winning bus master specifies the number of bus clock cycles of bus use requested by said winning bus master.

3. The bus arbitration system of claim 2 wherein each bus grant by said centralized bus arbiter to said winning bus master is a pulse whose width is equal to the number of bus clock cycles of bus use requested by said winning bus master.

4. The bus arbitration system of claim 1 wherein said centralized bus arbiter further comprises:
   a bus request recording circuit for recording bus requests from said bus masters;
   an arbitration circuit; and
   an interface coupling said bus request recording circuit and said arbitration circuit, said arbitration circuit accessing bus requests recorded in said bus request recording circuit via said interface, choosing a winning bus master among said bus masters that have unfulfilled bus requests for access to said bus, and sending out a bus grant to said winning bus master.

5. The bus arbitration system of claim 4 wherein said bus request recording circuit comprises counters and memories for recording the bus requests from said bus masters.

6. The bus arbitration system of claim 1 wherein the bus request by the bus requesting bus master is a series of consecutive pulses, a number of pulses in said series being equal to the number of bus clock cycles of bus use requested by said requesting bus master.

7. A bus request and bus grant method comprising the steps of:
   providing a bus arbitration system including a bus, a centralized bus arbiter, a plurality of bus masters sharing said bus, a plurality of bus request lines and a plurality of bus grant lines, each of said bus masters having a dedicated bus request line and a dedicated bus grant line connected to said centralized bus arbiter;
   sending bus requests on said bus request lines from said bus masters to said centralized bus arbiter and specifying a number of bus clock cycles of bus use requested by each of said bus masters by activating the bus request line of said bus master for a number of bus clock cycles related to the number of bus clock cycles of bus use requested by said bus master, the activation of the bus request line lasting for a number of bus clock cycles equal to the number of bus clock cycles of bus use requested by said bus master, each of said bus masters sending its own bus request on its own bus request line to said centralized bus arbiter;
   using said centralized bus arbiter to receive bus requests;
   using said centralized bus arbiter to choose a winning bus master among said bus masters that have unfulfilled bus requests; and
   using said centralized bus arbiter to send a bus grant to said winning bus master on the bus grant line of said winning bus master.

8. The method of claim 7 wherein said specifying the number of bus clock cycles of bus use requested by each of said bus masters comprises the step of sending on the bus request line of said bus master a series of consecutive pulses, the number of pulses in said series being related to the number of bus clock cycles of bus use requested by said bus master.

9. The method of claim 8 wherein the number of pulses in said series is equal to the number of bus clock cycles of bus use requested by said bus master.

10. The method of claim 9 wherein using said centralized bus arbiter to receive bus requests comprises the step of using a bus request recording circuit to record the number of bus clock cycles of bus use requested by each of said bus masters.

11. The method of claim 10 wherein said using the bus request recording circuit to record comprises the steps of:
   using counters to count the number of bus clock cycles of bus use requested each of said bus masters; and
   using memories to store the contents of said counters for later use by an arbitration circuit in said centralized bus arbiter.

12. The method of claim 10 wherein using said centralized bus arbiter to choose a winning bus master among said bus masters that have unfulfilled bus requests follows a first come first served policy.

13. The method of claim 12 wherein using said centralized bus arbiter to send the bus grant to said winning bus master comprises the step of activating the bus grant line of said winning bus master for a number of bus clock cycles related to the number of bus clock cycles of bus use requested by said winning bus master.

14. The method of claim 13 wherein activating bus grant line of said winning bus master lasts for a number of bus clock cycles equal to the number of bus clock cycles of bus use requested by said winning bus master.

* * * * *